United States Patent [19]

Allen et al.

[11] 4,256,311
[45] Mar. 17, 1981

[54] VIDEO DISC STYLUS RETRACTOR

[75] Inventors: James A. Allen, Monrovia; Michael E. Miller, Indianapolis, both of Ind.

[73] Assignee: RCA Corporation, New York, N.Y.

[21] Appl. No.: 81,485

[22] Filed: Oct. 3, 1979

[51] Int. Cl.³ .............................................. G11B 3/10
[52] U.S. Cl. ...................................... 369/170; 369/245
[58] Field of Search ...................... 274/23 R, 23 A, 37

[56] References Cited

U.S. PATENT DOCUMENTS

| 2,547,441 | 4/1951 | Cornwell | 274/23 R |
|---|---|---|---|
| 3,661,397 | 5/1972 | Worth | 274/23 R |
| 3,711,641 | 1/1973 | Palmer | 179/100.2 K |
| 3,952,145 | 4/1976 | Allen | 274/37 |
| 3,952,147 | 4/1976 | Leedom | 274/23 A |
| 3,956,581 | 5/1976 | Taylor | 274/23 R |
| 3,972,533 | 8/1976 | Huff | 274/23 R |
| 4,030,124 | 6/1977 | Allen | 274/37 |
| 4,049,280 | 9/1977 | Leedom | 274/37 |
| 4,053,161 | 10/1977 | Bleazey | 274/23 A |
| 4,059,277 | 11/1977 | DeStephanis | 274/23 A |

Primary Examiner—Steven L. Stephan
Attorney, Agent, or Firm—Eugene M. Whitacre; Joseph S. Tripoli; Eric P. Herrmann

[57] ABSTRACT

A mechanism for retracting a stylus from engagement with the surface of a video disc record. A lever arm arranged parallel to the stylus arm and normally biased to a first position has a filament attached to a free end thereof, the filament being normally disposed to straddle and engage the stylus carrying arm proximate to the stylus to lift and hold the stylus from the record surface. A force which is selectively imparted to the lever arm pivots the lever arm to a second position permitting disengagement of the filament and stylus arm permitting the stylus to engage the record.

11 Claims, 6 Drawing Figures

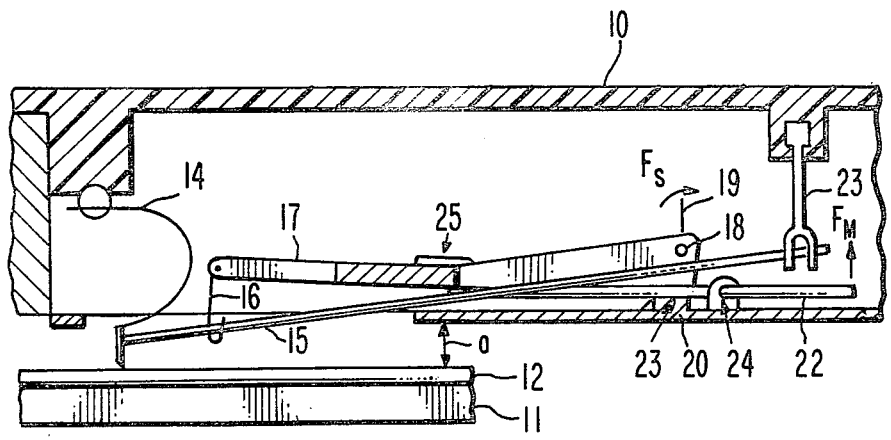
Fig. 1.
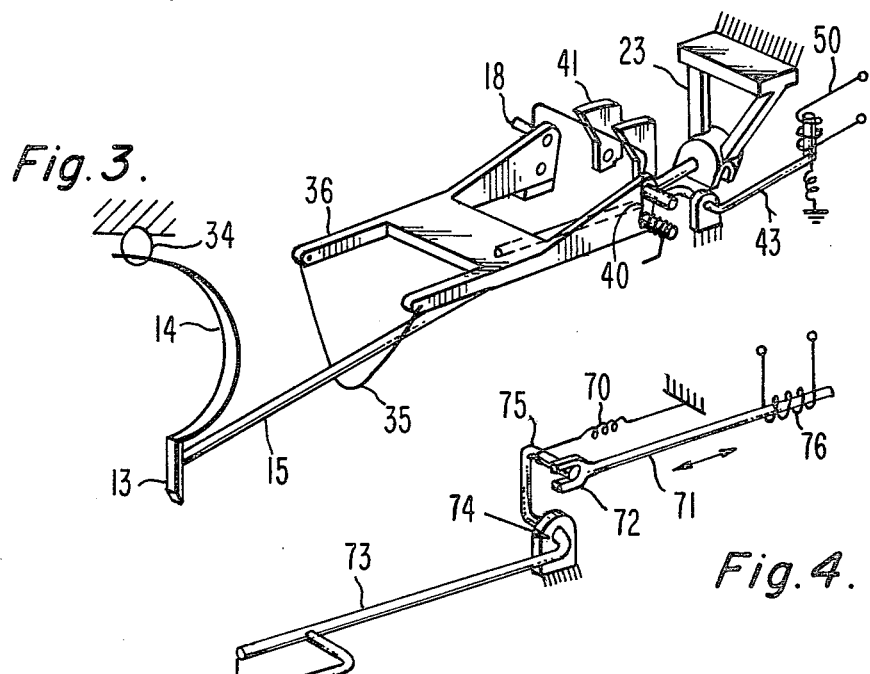
Fig. 3.
Fig. 4.
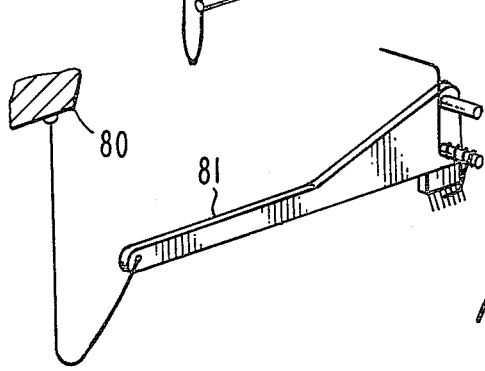
Fig. 5.

VIDEO DISC STYLUS RETRACTOR

This invention relates generally to stylus mechanisms for recovering information from high density record discs and in particular to apparatus for lowering the pickup stylus onto the record disc without damaging the stylus or the disc.

Systems for recovering recorded information from high density record discs wherein prerecorded data is contained in a spiral track with a convolution pitch of several micrometers employ very fragile pickup-stylus/stylus arm assemblies. A description of one such system is contained in U.S. Pat. No. 3,952,147 to M. A. Leedom. In the aforementioned patent, the pickup stylus is mounted to the free end of a stylus arm which in turn is mounted within a box-like carriage for radial translation across the disc. The stylus arm is arranged approximately parallel to the disc, the stylus and approximately one-half of the stylus arm protruding outside the lower portion of the carriage for contact with the disc. The upper surface of the disc and lower surface of the carriage are separated by a relatively small distance typically in the order of 0.1". Mechanisms for lifting and lowering the stylus out of and into engagement with the disc have generally been rigid structures contained within the carriage housing to preclude the possibility of such lifting/lowering mechanisms contacting and thereby possibly damaging the disc. Consequently the point at which the stylus lifting/lowering mechanism engages the stylus arm is no closer than half the length of the stylus arm toward the stylus.

It has been found that applying a force to the stylus arm to raise the stylus from the record at a point within the carriage or at a point not relatively close to the pickup stylus creates a bending moment in the stylus arm tending to momentarily force the stylus against the disc prior to lift-off. Since the styli in such systems are typically very small and have very fine points, even a small amount of pressure between the stylus and the record, in excess of normal tracking pressure, can cause the stylus to gouge and thereby permanently damage the disc. The present invention provides a stylus-raising mechanism which engages the stylus arm outside the carriage enclosure at a point relatively near the stylus to avoid creating bending moments in the stylus arm and subsequent gouging by the stylus.

In accordance with the present invention, a stylus lifting/lowering mechanism comprises a longitudinal member or boom having a first end mounted for pivotal movement of a second end thereabout; the second end being normally positioned at a point above and relatively near the stylus end of the stylus arm. A threadlike filament is attached to the second end of the boom and is arranged to hang beneath the stylus arm so as not to interfere with the stylus arm during playback. The utilization of a threadlike filament to engage the stylus arm allows it to be positioned near the stylus with little probability of it damaging the disc even were it to drag across the disc during playback. Raising the boom by a selectively actuated mechanism causes the filament to engage the stylus arm at a point near the stylus to lift the stylus/stylus arm away from the record surface.

A further aspect of the invention is the incorporation of the stylus lifting/lowering mechanism in a cartridge. A bias means is utilized to insure that the stylus is held within the cartridge enclosure whenever the cartridge is disengaged from the player.

In the drawings:

FIG. 1 is a diagrammatic illustration of a stylus lifting/lowering assembly in accordance with the present invention;

FIG. 3 is a partial perspective illustration of the lifter assembly incorporated in the cartridge of FIGS. 2A and 2B; and FIGS. 4 and 5 are diagrams of alternate stylus lifting/lowering arm structures.

Figure 2A:
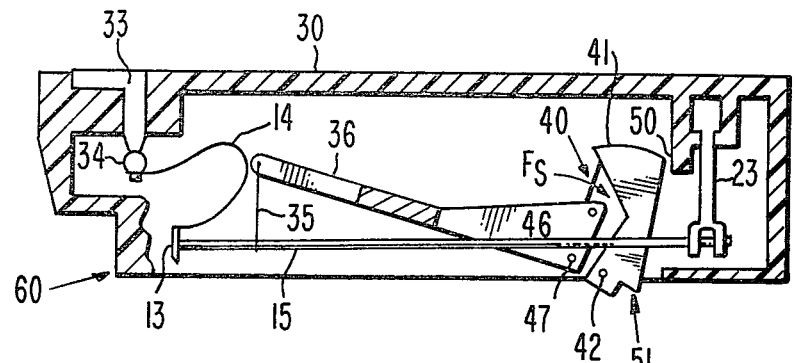
FIGS. 2A and 2B are diagrammatic illustrations embodying a stylus lifting/lowering assembly in a stylus cartridge free standing and engaged in a carriage assembly respectively.

In FIG. 1, carriage assembly 10 supports playback stylus 13 and translates the stylus radially (into the plane of the paper) across record disc 12. Record 12 contains prerecorded information on a spiral track which is engaged by the stylus 13. Relative motion between the stylus and the spiral track is developed by turntable 11 on which the disc 12 is mounted for recovering the information during playback.

Pickup or playback stylus 13 is mounted to the free end of relatively rigid stylus arm 15 extending through an aperture in the bottom of the carriage. Stylus arm 15 is pivotally mounted in compliant member 23 which allows for a degree of stylus arm movement along its longitudinal axis. Compliant member 23 may include a magnetic element between its horseshoe shaped stylus arm support for cooperating with a velocity adjusting system which imparts limited longitudinal motion to the stylus arm. See for example U. S. Pat. No. 3,711,641 entitled "Velocity Adjusting System". An electrically conductive flylead 14 forms a connection between an electrode on the stylus and the carriage assembly for transmission of electrical signals and to impart a prescribed pressure between the stylus and the disc. A pivotally mounted longitudinal support member 17 is fixedly connected to the carriage assembly by mounting member 20 so that support member 17 may freely rotate in a limited arc about pivot 23. A torsion spring having an extension 19 engaging a pin 18 protruding external to support member 17 is mounted about pivot 23 to impart a clockwise angular force, $F_S$, to support member 17 tending to lift the free end of member 17 in an upward direction in the absence of other applied forces.

A filament 16, e.g., a fine silk thread or monofilament polymer fiber is attached to the free end of support member 17 and arranged to form a loop disposed under and straddling the stylus arm in proximity to the stylus. The filament material is sufficiently compliant that should it contact the surface of the disc, when the arm is lowered, no damage will occur to the disc. During playback the filament does not interfere with longitudinal or radial translation of the stylus within the bounds of normally anticipated motion. However, when the system is not in the playback mode the support member 17 and consequently the filament 16 are pulled upward whereby filament 16 engages the stylus arm 15 thereby raising it into the carriage assembly.

A lever 22 is mounted to pivot about bearing surface 24 and engages the support member 17 at 25 to counterpose the angular force $F_S$ imparted by the spring extension 19. The rightmost end of the lever 22 (not shown) connects with a transducer, for selectively imparting a force $F_M$ to counteract the force of the spring thereby producing limited counterclockwise movement of member 17 to permit the filament 16 to gently lower the stylus arm and, therefore, lower the stylus for engagement with the disc.

In the FIG. 2A, stylus arm 15 is pivotally mounted via compliant member 23 to a cartridge enclosure 30. Stylus 13, mounted at the free end of stylus arm 15, is electrically connected by flylead 14 to the cartridge signal terminal or contact strip 33. Support member 36, mounted for pivotal movement about point 47 is maintained in a retracted position by the clockwise force $F_S$ exerted by the torsion spring 40. Filament 35, attached to the free end of support member 36 engages the stylus arm holding it within the confines of the cartridge.

A rotatable member 41 is pivotally mounted for rotation about point 42. A front surface of member 41 engages the spring 40 to produce clockwise motion of member 41 until its back surface encounters an extension 50 of the cartridge body to effect a stop to further rotation. A portion 51 of the rotatable member 41 extends below the cartridge body in the retracted position. Portion 51 is arranged to engage the carriage assembly, when the cartridge 30 is inserted into the carriage to generate a counterclockwise movement of the rotatable member 41. In so doing the spring extension is rotated counterclockwise effectively disengaging it from support member 36 and allowing the free end of member 36 to rotate counterclockwise about the point 47 and subsequently, with the aid of the spring forces in the flylead 14, permitting the lowering of the stylus outside the cartridge for engagement with the disc. It can easily be appreciated that inserting the cartridge into the carriage assembly left-most end first, pivoting the cartridge about point 60, and lowering the rightmost end of the cartridge so that the point 51 rests on a flat surface of the carriage assembly will produce a counterclockwise rotation of member 41.

Figure 2B:
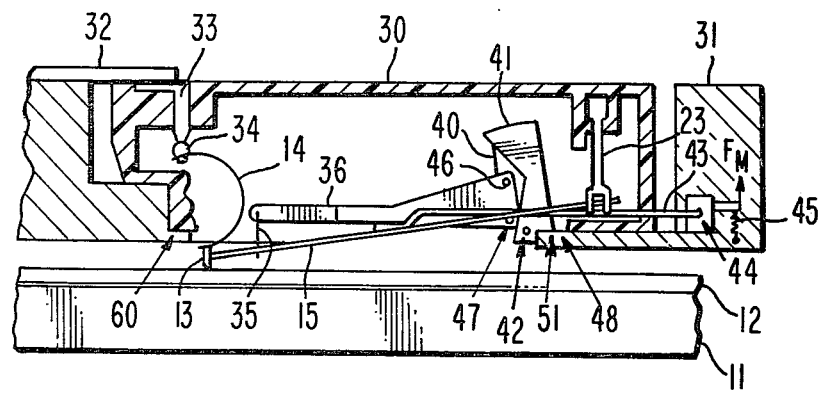

FIG. 2B illustrates the cartridge 30 in situ in the carriage assembly. Note that rotatable member 41 engages the flat surface 48 of the carriage assembly thereby positioning the spring extension 40 so that member 36 lowers the stylus.

In a further embodiment of the invention the function performed by the rotatable member 41 mounted in the cartridge is provided by a rigid member fixed to the carriage assembly thereby eliminating the rotatable members from the cartridge. On insertion of the cartridge, the extension of the torsion spring is engaged by the member fixed to the carriage causing the spring to disengage the longitudinal support member 36. Positional control of the member 36 and consequently stylus arm 15 is relinquished to the lever arm 43.

The cartridge 30 contains a slot in its lower surface for reception of lever arm 43. Lever arm 43 engages support member 36 and is normally biased by spring 45 to rotate member 36 in a clockwise direction. A force $F_M$ is selectively imparted to the lever arm 43 by a motive means, which counteracts the spring 45 force to allow the stylus to be lowered. Thus in the absence of force $F_M$, i.e., when power is not applied, the stylus/stylus arm is held in a retracted position within the cartridge enclosure.

FIG. 3 shows the lifter mechanism in perspective. In both FIG. 2 and FIG. 3 the support member and the rotatable members are indicated as rotating about separate pivot points, however, they may be arranged to rotate on a common pivot.

The FIGS. 4 and 5 illustrate two alternative support member configurations. In FIG. 4, forked support member 73 is mounted to pivot about point 74. Coil spring 70 attached to extension 75 of member biases the support member in the retracted position. Linear motor or solenoid 76 having an extended armature 71 engages extension 75 to selectively counteract the force of spring 70 for lowering the stylus.

In FIG. 5 a single-arm support member is illustrated wherein a first end of the filament is fixed as by connection to the cartridge 80 or, if desired, the first end may be fixed to the carriage and second end of the filament is attached to the support member 81.

What is claimed is:

1. In a system for recovering prerecorded information from a disc record, having an information track thereon, by a track-following stylus when said stylus engages said information track and relative stylus/record velocity is established, a combination comprising:

a stylus arm having a generally straight longitudinal axis, said arm having a track-following stylus mounted at a first end thereof, said stylus arm being pivotally supported at a second end thereof permitting engagement of the stylus with said information track;

means for selectively lowering the stylus to the disc record and lifting the stylus from the disc record including a flexible filament of sufficient compliance not to damage the disc record upon contact therewith, said filament being attached to hang in the form of a catenary from a selectively pivoted member and arranged to engage and cradle the stylus arm in proximity to the first end thereof.

2. In a system for recovering prerecorded information from a disc record, having a spiral information track thereon, by a track-following stylus when said stylus engages said information track and relative stylus/record velocity is established, a combination comprising:

a stylus arm having a longitudinal axis and having the track-following stylus mounted at a first end thereof;

means for yieldably supporting the end of the stylus arm remote from the first end, said means providing pivotal motion of the first end of the stylus arm thereabout;

means for selectively lowering the stylus to the disc record and lifting the stylus from the disc record including:

a. a longitudinal member substantially parallel to said stylus arm, said member being pivotally mounted at a first end so that a second end thereof can move in a direction toward and away from said disc;

b. a flexible filament having first and second ends at least one of which is attached to the second end of the longitudinal member and suspended therefrom, in the form of a catenary and arranged to engage and support in the vertex thereof the stylus arm in proximity to the first end of the stylus arm in cooperation with the longitudinal member;

c. selectively actuated means for imparting pivotal motion in one direction to the longitudinal member such that said filament is ultimately disengaged from the stylus arm thereby permitting engagement of the stylus and the record, said selectively actuated means providing pivotal motion in another direction to the longitudinal member to cause disengagement of the stylus and the record at selected times.

3. The combination as set forth in claim 2 wherein the means for selectively lifting and lowering the stylus further includes bias means applied to the longitudinal member for maintaining the stylus in a raised position and disengaged from the record in the absence of force applied to the longitudinal member by the means for imparting pivotal motion.

4. The combination as set forth in claim 2 wherein the means for imparting pivotal motion to the longitudinal member comprises:
 a lever pivotally mounted at a fulcrum, having a first end arranged to contact the longitudinal member and having a second end;
 a transducer means responsive to prescribed control signals, and mounted for imparting motion to the second end of the lever causing said lever to pivot about the fulcrum and raise and lower the longitudinal member in response to said signals.

5. A cartridge for reception in a carriage mechanism and for supporting a stylus assembly of the type used in recovering prerecorded information contained in a spiral track, disposed on a record disc, by a track-following stylus, comprising:
 a stylus arm having said stylus mounted at a first end and having a second end;
 a generally longitudinal protective enclosure for the stylus arm assembly, said enclosure having an opening through which the stylus arm may protrude;
 means for mounting the second end of the stylus arm in said enclosure in a generally parallel relationship to the longitudinal axis of the enclosure and providing pivotal motion thereabout;
 a rigid member having a first end pivotally mounted to the enclosure in general proximity to the means for mounting the stylus arm and having a second end extending toward the first end of the stylus arm;
 a flexible filament having at least one end attached to the second end of the rigid member, said filament generally hanging in catenary-like form, and arranged for engaging and supporting the stylus arm at a point near the stylus and for normally holding the stylus within the confines of the enclosure.

6. The cartridge as set forth in claim 5 wherein the filament comprises a monofilament compliant polymer.

7. The cartridge as set forth in claim 5 wherein the filament comprises a thread of fibrous material.

8. The cartridge as set forth in claim 5 further including bias means for pivoting the rigid member to constrain the stylus arm within the cartridge enclosure when the cartridge is removed from the carriage mechanism.

9. The cartridge as set forth in claim 8 wherein the bias means comprises a spring for imparting angular motion about an axis, said spring being axially mounted concentric with the pivot point of the rigid member, said spring further having an extension oriented radially from the pivot point and arranged to releasably engage the rigid member causing said rigid member to rotate about its pivot point for holding the stylus within the enclosure.

10. The cartridge as set forth in claim 9 further comprising means for disengaging the spring extension from the rigid member when the cartridge is received in the carriage mechanism.

11. A cartridge for reception in a carriage mechanism and for supporting a stylus assembly of the type used in recovering prerecorded information contained in a spiral track, disposed on a record disc, by a track-following stylus, comprising:
 a stylus arm having said stylus mounted at a first end and having a second end;
 a generally longitudinal protective enclosure for the stylus arm assembly, said enclosure having an opening through which the stylus arm may protrude;
 means for mounting the second end of the stylus arm in said enclosure in a generally parallel relationship to the longitudinal axis of the enclosure and providing pivotal motion thereabout;
 a rigid member having a first end pivotally mounted to the enclosure in general proximity to the means for mounting the stylus arm and having a second end extending toward the first end of the stylus arm;
 a flexible filament having at least one end attached to the second end of the rigid member, said filament generally hanging in catenary-like form, and arranged for engaging and supporting the stylus arm at a point near the stylus and for normally holding the stylus within the confines of the enclosure;
 a spring for imparting angular motion about an axis, axially mounted concentric with the pivot point of the rigid member, said spring having an extension oriented radially from the pivot point and arranged to releasably engage the rigid member for rotating said rigid member about its pivot point and holding the stylus within the enclosure; and
 a rotatable member pivotally mounted to said enclosure in proximity to said spring extension; said rotatable member having a first end bearing on the spring extension and a second end partially extending outside the cartridge enclosure, the second end of the rotatable member being arranged to engage and bear on a surface of the carriage mechanism upon insertion of the cartridge in the carriage whereby the rotatable member is caused to rotate and engage the spring extension such that the spring extension is disengaged from the rigid member.

* * * * *